Patented Jan. 15, 1952

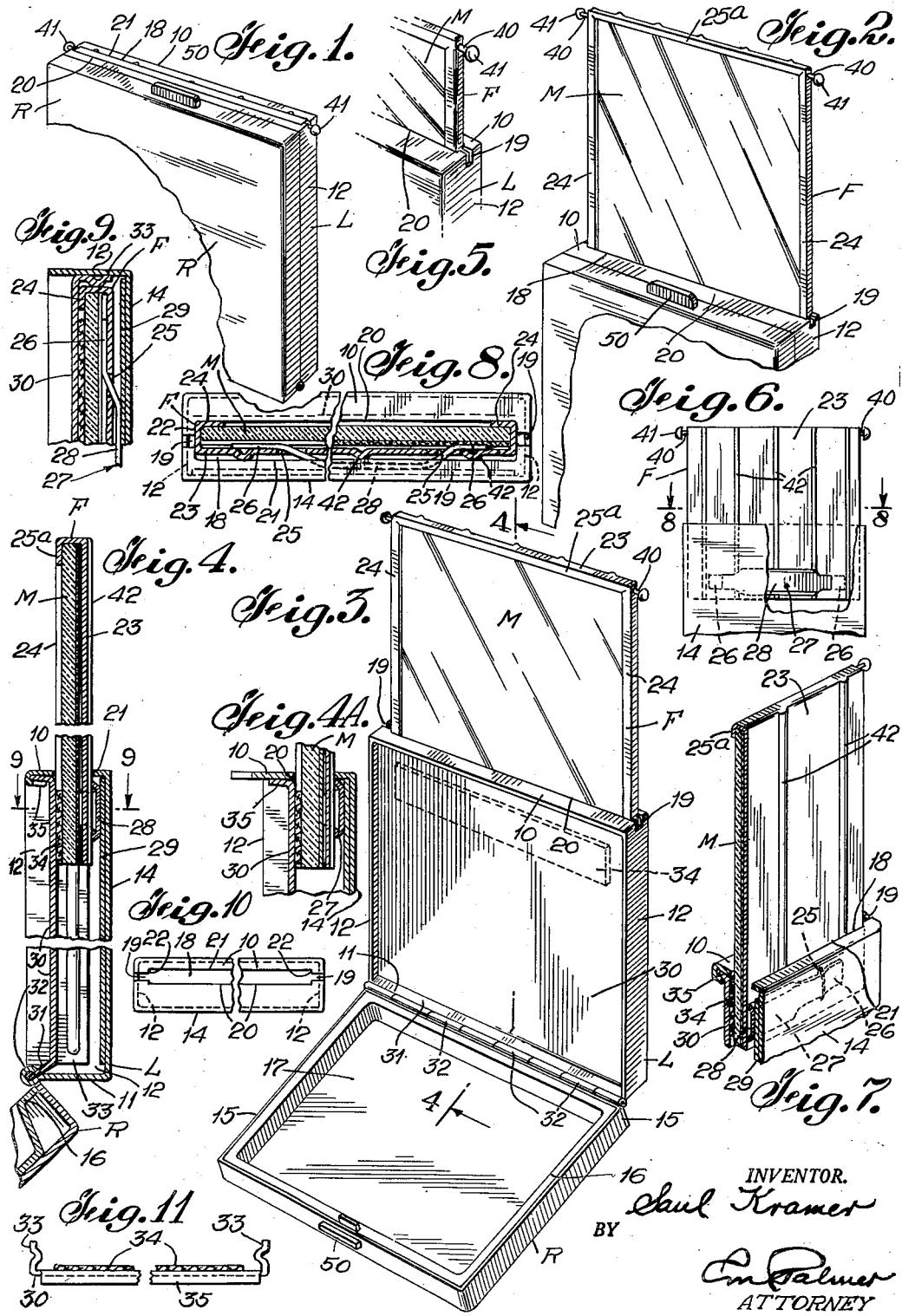

2,582,593

UNITED STATES PATENT OFFICE 2,582,593

COMPACT

Saul Kramer, Brooklyn, N. Y., assignor of one-fourth to Charles M. Palmer, Washington, D. C.

Application April 29, 1948, Serial No. 24,020

3 Claims. (Cl. 88—92)

This invention is a novel and improved compact featuring the utilization of a slidably guided mirror adapted to be withdrawn from the closing cover of the compact in the closed or opened relation of the latter. One object of the invention is predicated upon serviceable means in the form of a mirror for desirably holding a resilient bow shaped strap in place on the mirror frame to cooperate with a wall of the closing cover to hold the mirror in a fully closed or opened relation or partly withdrawn from the cover. The invention has a further object to provide a bowed leaf spring having ends threaded into the backing of the mirror frame which includes spaced ribs to facilitate stabilizing thereof against chattering relative to a guide opening through which the mirror frame may be projected or withdrawn. The invention further comprehends employment of a bowed spring threaded into and laterally overhanging the mirror frame and cooperating with a wall of the peripheral rim of the closing cover to limit withdrawal of the mirror frame. Other objects and advantages will appear from the following detailed specification taken with the accompanying drawings wherein:

Fig. 1 is a perspective view of the compact according to my invention shown closed and with the mirror carrying frame fully concealed therein.

Fig. 2 is a fragmentary view of Fig. 1 but with the mirror carrying frame fully withdrawn.

Fig. 3 is a perspective view of the compact shown fully open and the mirror frame almost fully withdrawn.

Fig. 4 is a transverse sectional view on the line 4—4 of Fig. 3.

Fig. 4A is a fragmentary view of Fig. 4 however showing the bowed spring striking the upper part of the lid to limit withdrawal of the mirror and further illustrates the upper part of the insert merely positioned within the cover prior to securing thereof.

Fig. 5 is a fragmentary view of Fig. 1 however showing the mirror carrying frame partly withdrawn.

Fig. 6 is a rear view of the swingable cover, shown partly broken away to illustrate the ribbed mirror carrying frame and the bowed leaf spring threaded thereto.

Fig. 7 is a fragmentary rear perspective view of Fig. 4.

Fig. 8 is a sectional view on the line 8—8 of Fig. 6.

Fig. 9 is a fragmentary sectional view on the line 9—9 of Fig. 4.

Fig. 10 is a top view of the cover however with the mirror carrying frame removed, and Fig. 11 is a plan view of the insert.

As shown the compact is in rectangular form having the powder receiving receptacle R to which the cover L is swingably connected.

Preferably the cover is stamped from a single sheet of stock and embodies the rim constituted by the front wall 10, the rear wall 11 and the spaced sides 12. This rim depends from wall 14 and is adapted to be seated on the squared shaped upstanding rim 15 of the receptacle R retaining the hollow mount 16 defining the power compartment 17.

Of importance is the rectangular opening 18 formed in the front wall 10 which is interrupted with the notches 19 communicating with opening 18 and extending into the spaced sides 12.

Front and rear walls 20 and 21 and interrupted sides 22 of opening 18 slidably guide frame F in and out of the lid or cover L. The frame may be of a suitable sheet metal comprising backing 23 having the inwardly turned flanges 24 and the downwardly turned flange 25ª thus forming channeled sides and top wall in which corresponding margins of the mirror M are retained.

Attention is directed to the fact that backing 23 is provided with the spaced slots 25 in which the reduced ends or offset wings 26 of the resilient strap 27 are threaded. The slightly bowed or central position 28 of this U-shaped strap or spring 27 yieldingly bears against a paper lining 29 fastened to inside face of wall 14 and normally urges the frame away from the backing 23 but action is resisted by the channel shaped insert or closure and locking plate 30 having its lower and biased lip 31 held under and interlocked with the spaced beaded portions 32 extending from wall 11. The locking plate 30 may now be swung towards the mirror to permit its spaced sides 33 to be closely received between and straddled by the spaced sides 12 of the closure cover L whereby the relatively soft chamois strip 34 glued to the upper part of the insert 30 bears against and wipes the mirror M at which time the biased or inclined lip or flange 35 at the upper part of backing 30 comes under and against the upper or front wall 10 and thereafter the forward part of the latter is bent under and against lip 35 to retain the same in place. By this arrangement the closure plate or insert 30 is desirably anchored within lid L and in a parallel relation with wall 14 forming a compartment within which the mirror frame or casing is slidably guided.

At all times the intermediate portion 28 of the bowed leaf spring is frictionally but yieldingly held against the fixed lining 29 of the lid and insert 30 holds such relation in that ends or wings 26 offset relative to the intermediate portion 28 are urged by the insert 30 towards lining 29 on final anchoring of this insert within the cover, thus holdng leaf spring 27 normally compressed or energized. It follows that irrespective of the extent of withdrawal of the mirror carrying frame relative to the lid, the former is yieldingly sustained against accidental displacement and will prevent complete withdrawal of the frame F. It will be noted that the intermediate bowed part 28 of the leaf spring 27 laterally overhangs backing 23 of the frame F and cooperates with the top wall 10 of the cover (Fig. 4) to limit withdrawal of the frame out of the cover L.

Downward finger pressure on frame F overcomes the resistance offered by the normally tensioned strap 27 against cover L and hence frame F may be conveniently and completely retracted into the cover coincident with the reception of pins 40 carried by the latter into notches or keepers 19, the bottom walls of which cooperate with the pins to limit the retractive displacement. Heads 41 carried by pins 40 overhang the sides of the cover or closure L and are easily accessible for grasping by the fingers for withdrawing or retracting frame F.

The chamois strip 34 tends to wipe the mirror as it is slidably moved into and out of the cover. It should also be observed that the rear wall or backing 23 of frame F is provided with the spaced strengthening ribs 42 which have many functions, to wit, one, they serve in cooperation with side wall 21 of opening 18 to space the backing 23 except for these ribs away from this wall 21, thereby preventing marring or scratching; they also serve to stabilize the frame F against chattering, and also prevent distortion or warping of the backing 23. As is well understood, a conventional spring controlled latch 50 may be employed to disengageably lock the cover to the receptacle R.

In Fig. 8 the bowed leaf spring 27 has its ends 26 shown threaded into slots 25 and it will be noted that the mirror M after its insertion into the frame F holds such ends in place against the inside face of the backing 23, thus preventing accidental slidable shifting of the outside bowed portion 28 into or out of the notches 25, or in other words the mirror holds this spring in a desired clamped or fixed relation to permit the bowed or arcuate part 28 to desirably laterally overhang the backing.

Since the mirror frame is closely guarded by the walls of the opening 18 of the peripheral rim constituted by the spaced walls 10 and 11 and the spaced sides 12 and since the spaced ribs 42 of the backing also serve to stabilize movement of the mirror frame, the latter is held against needless play or wobbling. In addition the spring 27 also yieldingly urges the frame against wall 20 of opening 18 and against the insert 30 which serves as a closure to effectively shield the mirror from the powder compartment.

Various changes may be made in details of construction and arrangement of parts without departing from the spirit of the invention or sacrificing any of the advantages thereof inherent therein.

I claim:

1. In a device of the character described, a closure for a compact comprising a wall having a peripheral rim including an opening, an insert attached to and within said closure and defining therewith a compartment, a slidably guided frame within and movable into and out of said compartment and comprising channeled sides and a backing integral with said sides and having spaced slots, a mirror fixedly retained between said sides and bodily movable with said frame through said opening, and a U-shaped resilient strap having wings threaded into said slots and having a bowed portion extending towards and cooperating with said wall to resist accidental slidable displacement of said frame relative to said closure.

2. In combination, a closure having a peripheral rim including an opening, carrier means slidably guided by the walls of said opening and comprising a backing including spaced slots, a leaf spring embodying ends threaded into said slots and disposed against the inner surface of said backing and including a bowed portion laterally overhanging an outside face of said backing, and a mirror supported by said carrier means for retaining said ends against said inner surface.

3. In combination, a closure having a peripheral rim including an opening, a frame slidably guided by the walls of said opening and comprising a backing including spaced slots and channeled sides, a leaf spring embodying ends threaded into said slots and disposed against the inner surface of said backing and including a bowed portion laterally overhanging an outside face of said backing, and a mirror held within said channeled sides for retaining said ends against said inner surface.

SAUL KRAMER.

REFERENCES CITED

The following references are of record in the file of this patent:

UNITED STATES PATENTS

| Number | Name | Date |
|---|---|---|
| 307,559 | Mader | Nov. 4, 1884 |
| 1,780,736 | Bassett | Nov. 4, 1930 |
| 1,773,736 | Hodny | Aug. 26, 1930 |
| 1,804,487 | Yoshioka | May 12, 1931 |
| 2,005,362 | Clausen | June 18, 1935 |
| 2,006,962 | Ostrander et al. | July 2, 1935 |
| 2,025,971 | Callowhill | Dec. 31, 1935 |
| 2,106,254 | Newell | Jan. 25, 1938 |
| 2,205,974 | Kramer | June 25, 1940 |
| 2,209,789 | Mureau | July 30, 1940 |